United States Patent
Catalano et al.

(10) Patent No.: US 10,587,920 B2
(45) Date of Patent: *Mar. 10, 2020

(54) COGNITIVE DIGITAL VIDEO FILTERING BASED ON USER PREFERENCES

(71) Applicant: INTERNATIONAL BUSINESS MACHINES CORPORATION, Armonk, NY (US)

(72) Inventors: Pasquale A. Catalano, Wallkill, NY (US); Andrew G. Crimmins, Montrose, NY (US); Arkadiy Tsfasman, Wappingers Falls, NY (US); John Werner, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,118

(22) Filed: Dec. 8, 2017

(65) Prior Publication Data

US 2019/0104342 A1 Apr. 4, 2019

Related U.S. Application Data

(63) Continuation of application No. 15/719,869, filed on Sep. 29, 2017.

(51) Int. Cl.
*H04N 21/4147* (2011.01)
*H04N 21/433* (2011.01)
(Continued)

(52) U.S. Cl.
CPC ..... *H04N 21/45457* (2013.01); *G06F 16/735* (2019.01); *G06F 16/783* (2019.01);
(Continued)

(58) Field of Classification Search
USPC ....... 386/241; 707/770; 715/722; 725/44, 48
See application file for complete search history.

(56) References Cited

U.S. PATENT DOCUMENTS

| 5,999,688 A | 12/1999 | Iggulden et al. |
| 7,096,486 B1 * | 8/2006 | Ukai ................. H04N 5/44543 |
| | | 348/E5.105 |

(Continued)

FOREIGN PATENT DOCUMENTS

| WO | 0122406 A1 | 3/2001 |
| WO | 2005086471 A1 | 9/2005 |

(Continued)

OTHER PUBLICATIONS

Carlson, "Tapping into TiVo: Digital video recorders and the transition from schedules to surveillance in television", New Media & Society, vol. 8, No. 1 (2006), pp. 97-115.

(Continued)

*Primary Examiner* — Thai Q Tran
*Assistant Examiner* — Syed Y Hasan
(74) *Attorney, Agent, or Firm* — Richard A. Wilhelm

(57) ABSTRACT

A method and system for digital video content filtering is provided and includes receiving a request to filter instances of recorded digital video content, based on user preferences from a user profile. The instances are segmented based on a cognitive analysis using content tags in the instances. The computer accesses a relationship map and tags from the user profile. The relationship map describes how the segments from the instances of recorded digital video content are related to each other. The computer performs a cognitive analysis of the user profile data utilizing the accessed relationship map and tags. A relevance score is assigned to the instances of recorded digital video content, which indicates a strength of the relationship between the identified instances and the user viewing preferences and/or keywords.

(Continued)

Relevant segments are identified based on the relevance score exceeding a predetermined threshold value. The relevant segments are stored on the computer.

7 Claims, 7 Drawing Sheets

(51) Int. Cl.
| | |
|---|---|
| *H04N 21/44* | (2011.01) |
| *H04N 21/45* | (2011.01) |
| *H04N 21/4545* | (2011.01) |
| *H04N 21/466* | (2011.01) |
| *H04N 21/485* | (2011.01) |
| *H04N 21/845* | (2011.01) |
| *H04N 21/8549* | (2011.01) |
| *G06F 16/735* | (2019.01) |
| *G06F 16/78* | (2019.01) |
| *G06F 16/783* | (2019.01) |

(52) U.S. Cl.
CPC ..... *G06F 16/7867* (2019.01); *H04N 21/4147* (2013.01); *H04N 21/4334* (2013.01); *H04N 21/44008* (2013.01); *H04N 21/4532* (2013.01); *H04N 21/4662* (2013.01); *H04N 21/4667* (2013.01); *H04N 21/8456* (2013.01); *H04N 21/8549* (2013.01); *H04N 21/485* (2013.01)

(56) References Cited

U.S. PATENT DOCUMENTS

| | | | |
|---|---|---|---|
| 7,197,758 B1 | 3/2007 | Blackketter et al. | |
| 7,269,330 B1 | 9/2007 | Iggulden | |
| 7,444,660 B2 | 10/2008 | Dudkiewicz | |
| 7,540,009 B1 | 5/2009 | Bryant et al. | |
| 7,738,778 B2 | 6/2010 | Agnihotri et al. | |
| 7,894,709 B2 | 2/2011 | Barbieri | |
| 7,895,625 B1 | 2/2011 | Bryan et al. | |
| 8,001,143 B1 * | 8/2011 | Gupta | G06F 17/3082 345/614 |
| 8,230,343 B2 | 7/2012 | Logan et al. | |
| 8,467,660 B2 | 6/2013 | Gilpin | |
| 8,645,832 B2 | 2/2014 | Pea et al. | |
| 8,804,999 B2 | 8/2014 | Ho et al. | |
| 9,008,489 B2 | 4/2015 | Nakazawa et al. | |
| 9,420,355 B2 | 8/2016 | Lock | |
| 9,513,778 B1 | 12/2016 | Zhang et al. | |
| 9,569,549 B1 | 2/2017 | Jenkins et al. | |
| 9,767,158 B1 | 9/2017 | Lewis et al. | |
| 2002/0069218 A1 | 6/2002 | Sull et al. | |
| 2002/0163532 A1 | 11/2002 | Thomas et al. | |
| 2007/0220554 A1 | 9/2007 | Barton et al. | |
| 2008/0134039 A1 | 6/2008 | Fischer et al. | |
| 2009/0133090 A1 | 5/2009 | Busse | |
| 2010/0183279 A1 | 7/2010 | Pradeep et al. | |
| 2010/0199295 A1 | 8/2010 | Katpelly et al. | |
| 2011/0184807 A1 | 7/2011 | Wang et al. | |
| 2012/0330950 A1 | 12/2012 | Pichumani et al. | |
| 2013/0103624 A1 | 4/2013 | Thieberger | |
| 2014/0236725 A1 | 8/2014 | Golden et al. | |
| 2014/0282772 A1 | 9/2014 | Chen et al. | |
| 2015/0009363 A1 | 1/2015 | Li et al. | |
| 2015/0264092 A1 | 9/2015 | Herger et al. | |
| 2016/0012066 A1 | 1/2016 | Ning et al. | |
| 2016/0042481 A1 | 2/2016 | Williams et al. | |
| 2016/0057482 A1 | 2/2016 | Anderson et al. | |
| 2016/0227285 A1 | 8/2016 | Voss | |
| 2016/0307044 A1 | 10/2016 | Marilly et al. | |
| 2016/0330521 A1 | 11/2016 | Yang et al. | |
| 2017/0031690 A1 | 2/2017 | Ren | |
| 2017/0280099 A1 | 9/2017 | John | |
| 2018/0035151 A1 | 2/2018 | Jassin et al. | |

FOREIGN PATENT DOCUMENTS

| | | |
|---|---|---|
| WO | 2011162648 A1 | 12/2011 |
| WO | 2016190945 A1 | 12/2016 |

OTHER PUBLICATIONS

Mell et al., "The NIST Definition of Cloud Computing", Recommendations of the National Institute of Standards and Technology, NIST Special Publication 800-145, Sep. 2011, 7 pages.

Lin et al., "Optimizing User Expectations for Video Semantic Filtering and Abstraction," IEEE International Symposium on Circuits and Systems (ISCAS 2005), IEEE, 2005, pp. 1250-1253.

Cattuto et al., "Semantic Grounding of Tag Relatedness in Social Bookmarking Systems", ISWC 2008, LNCS 5318, pp. 615-631, 2008.

Wang et al., "Joint Social and Content Recommendation for User-Generated Videos in Online Social Network", IEEE Transactions on Multimedia, vol. 15, No. 3, Apr. 2013, pp. 698-709.

Dickersen et al., "Music Recommendation and Query-by-Content Using Self-Organizing Maps", Proceedings of International Joint Conference on Neural Networks, Jun. 14-19, 2009, pp. 705-710.

Catalano et al., Pending U.S. Appl. No. 15/719,869, filed Sep. 29, 2017, entitled "Cognitive Digital Video Filtering Based on User Prferences", pp. 1-36.

Catalano et al., Pending U.S. Appl. No. 15/719,904, filed Sep. 29, 2017, entitled "Video Content Relationship Mapping", pp. 1-57.

Catalano et al., Pending U.S. Appl. No. 15/719,888, filed Sep. 29, 2017, entitled "Cognitive Digital Video Recorder", pp. 1-50.

IBM: List of IBM Patents or Patent Applications Treated As Related (Appendix P), Dec. 28, 2017, pp. 1-2.

Catalano et al., Pending U.S. Appl. No. 15/835,868, filed Dec. 8, 2017, entitled "Cognitive Digital Video Recorder", pp. 1-46.

Catalano et al., Pending U.S. Appl. No. 15/835,552, filed Dec. 8, 2017, entitled "Video Content Relationship Mapping", pp. 1-52.

\* cited by examiner

COGNITIVE DIGITAL VIDEO FILTERING BASED ON USER PREFERENCES

BACKGROUND

The present disclosure relates to filtering digital video content based on user preferences. More specifically, the present disclosure relates to filtering digital video content using a software application to apply cognitive analysis to perform the filtering.

Digital video recording is a popular method for saving digital video content for viewing at another time after it was broadcast live. Digital video recorders are commonly used to record digital video content when a user will not be physically present to watch the initial broadcast of the digital video content, or when there is a time conflict between two programs being broadcast at the same time.

The lengths of digital videos can vary, depending on the type of broadcast. For example, a sports competition or movie can exceed one hour in length, whereas a situation comedy or game show may only be thirty minutes. As a result, only a portion of the digital video may contain content that is of interest to the viewer. In addition, the interesting portion can be located deep within the digital video content. The remaining digital video content may be of no interest, but the viewer must search through the extraneous content to reach the portion that is of interest. It can be time consuming and an inefficient use of the limited digital video recorder storage to search an entire instance of digital video content when only a small portion is of interest to the viewer.

SUMMARY

The present disclosure provides a method for intelligent digital video content filtering, including receiving a request to filter instances of recorded digital video content, stored on a computer readable medium, based on user preferences included in a user profile. The instances of recorded digital video content are segmented based on a cognitive analysis using content tags in the instances. The computer accesses a relationship map and tags from the user profile, whereby the relationship map describes how the segments from the instances of recorded digital video content are related to each other, and the tags are used to describe digital video content. Cognitive analysis is performed on the user profile data utilizing the accessed relationship map and tags. A relevance score is assigned to the identified instances of recorded digital video content, whereby the relevance score indicates a strength of a relationship between the identified instances and the user viewing preferences and/or keywords. Relevant segments are identified from the instances of recorded digital video content based on the relevance score exceeding a predetermined threshold value. The relevant segments are stored on the computer.

In another aspect of the present invention, a system for intelligent digital video content filtering is presented. The system includes a computer system having a processor, a computer-readable storage medium, and program instructions stored on the computer-readable storage medium being executable by the processor, to cause the computer system to perform a method. The system includes receiving a request to filter instances of recorded digital video content, stored on a computer readable medium, based on user preferences included in a user profile. The instances of recorded digital video content are segmented based on a cognitive analysis using content tags in the instances. The computer accesses a relationship map and tags from the user profile, whereby the relationship map describes how the segments from the instances of recorded digital video content are related to each other, and the tags are used to describe digital video content. Cognitive analysis is performed on the user profile data utilizing the accessed relationship map and tags. A relevance score is assigned to the identified instances of recorded digital video content, whereby the relevance score indicates a strength of a relationship between the identified instances and the user viewing preferences and/or keywords. Relevant segments are identified from the instances of recorded digital video content based on the relevance score exceeding a predetermined threshold value. The relevant segments are stored on the computer.

In another aspect of the present invention, a computer program product in a computer networked environment for intelligent digital video content filtering is presented. The computer program product includes a computer readable storage medium having program instructions embodied thereon. The computer readable storage medium is not a transitory signal per se, and the program instructions are executable by a computer to cause the computer to perform a method. The computer program product includes receiving a request to filter instances of recorded digital video content, stored on a computer readable medium, based on user preferences included in a user profile. The instances of recorded digital video content are segmented based on a cognitive analysis using content tags in the instances. The computer accesses a relationship map and tags from the user profile, whereby the relationship map describes how the segments from the instances of recorded digital video content are related to each other, and the tags are used to describe digital video content. Cognitive analysis is performed on the user profile data utilizing the accessed relationship map and tags. A relevance score is assigned to the identified instances of recorded digital video content, whereby the relevance score indicates a strength of a relationship between the identified instances and the user viewing preferences and/or keywords. Relevant segments are identified from the instances of recorded digital video content based on the relevance score exceeding a predetermined threshold value. The relevant segments are stored on the computer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
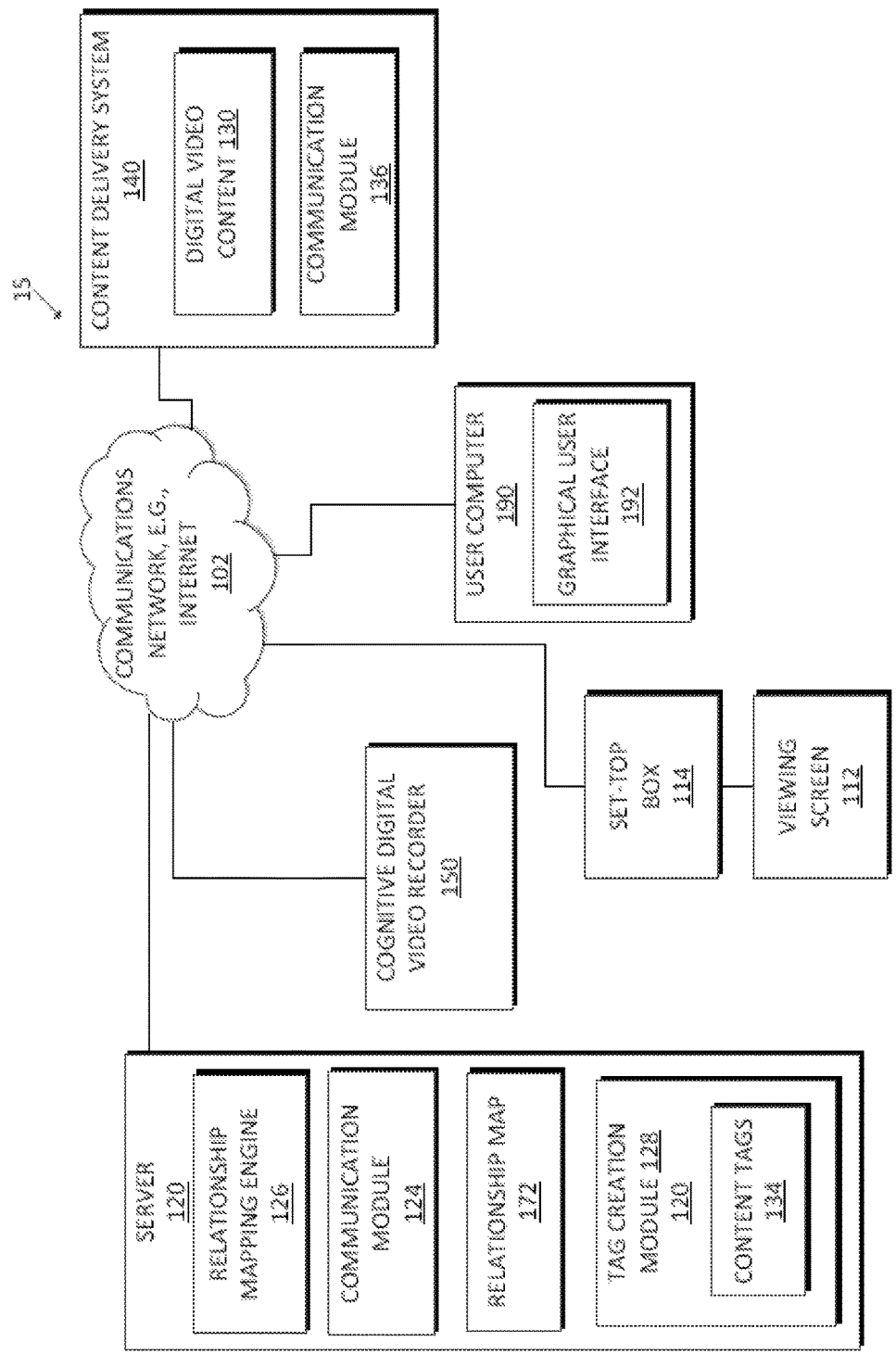
FIG. 1 is a schematic block diagram illustrating an overview of a system and methodology for using cognitive analysis to record portions digital video content.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

In one example, according to embodiments of the present invention, digital video content can be recorded on a computing device, such as a cognitive digital video recorder. Digital video recorders can record content for a user, based on the user's selection of content for recording. The user may only wish to view a specific portion of the digital video content. Additionally, a parent may wish to filter out portions that are unsuitable, for example, based on the age of a child. It can be time consuming and an inefficient use of the limited digital video recorder storage to search an entire instance of digital video content when only a small portion is of interest to the viewer.

Therefore, it would be desirable for a method and system to provide intelligent filtering of digital video content on a recording medium, in order to reduce the need to view entire instances of digital video content to find portions of interest. In one embodiment, a method and system provides filtering of recorded digital video content. In another embodiment, a method and system provides recording additional portions of relevant digital video content based on a user's viewing preferences, and appending the portions together for continuous viewing.

The embodiments of the present invention tend to improve the technology of digital video recorders. The addition of cognitive analysis extends their capability by reiteratively applying techniques such as self-learning, data mining, pattern recognition and natural language processing to the problem of determining which portions of digital video content should be retained. More particularly, when used as a parental control, the combination of cognitive analysis to the digital video recorder ensures removal of undesired portions of the digital content.

FIG. 1 depicts a system 15 suitable for a method for cognitive digital video content filtering. The system 15 includes a communications network 102, a content delivery system 140, a user computer 190, a set-top box 114, a viewing screen 112, a cognitive digital video recorder (CDVR) 150, and a server 120.

The communications network 102 may be any combination of connections and protocols that will support communications between the devices in system 15. Examples include a local area network (LAN), a wide area network (WAN) such as the internet, or a combination of the two, and can include wired, wireless, or fiber optic connections.

The content delivery system 140 includes a communication module 136, and instances of digital video content 130. The content delivery system 140 can be a distributed server capable of delivering instances of digital video content 130 to the CDVR 150 or server 120 using the communications module 136. The communication module 136 can be any technology capable of delivering digital video content 130 to the CDVR 150 or server 120 over the communications network 102.

Each instance of digital video content 130 includes metadata that the content delivery system 140 or the creator of the digital video content 130 adds. The metadata includes at least one content tag 134 that describes the digital video content 130. The content tags 134 can be extracted and examined, and can identify the subject, creator, and length, among other attributes, of the digital video content 130.

The server 120 includes a communication module 124, a relationship mapping engine 126, a tag creation module 128 with tag storage 134, and a relationship map 172. The communication module 124 can be a technology capable of allowing the server 120 to communicate with the content delivery system 140, CDVR 150, the set-top box 114, and/or the user computer 190 over a communications network, for example, the communications network 102.

Digital video content 130 is streamed to the relationship mapping engine 126, which generates content tokens describing the images in the digital video content 130 by actors, objects, and scenery, among other key features. The relationship mapping engine 126 then generates tags from the tokens. Additional tags may be generated from tonal extraction, content spoken by the characters and actors, and personalities of the characters.

The relationship mapping engine 126 uses techniques including visual recognition and natural language processing to locate tokens in the video and audio, respectively. Digital video content 130 is streamed to the relationship mapping engine 126, which generates content tokens describing the images in the digital video content 130 by actors, objects, and scenery, among other key features. The relationship mapping engine 126 then generates tags from the tokens. Additional tags may be generated from tonal extraction, content spoken by the characters and actors, and personalities of the characters. Each tag represents location information, such as a timestamp or duration, indicating an occurrence where the token was recognized within the body of work, for example, a movie. There can be multiple occurrences of each tag. The tags are stored by frequency in memory or in a database, for example tag storage 134. The relationship mapping engine 126 compares the tags for each body of work. A relationship between bodies of work is created when there is a match of high frequency tokens, such as theme. The strength of the relationship can be based on factors including tag occurrence or a number of matching tags. The relationship mapping engine 126 generates a relationship map 172 (FIG. 1) between bodies of work using the strength of relationships.

The relationship map 172 can be created between instances of digital video content 130 that have been analyzed by the relationship mapping engine. The relationship map 172 indicates whether instances of digital video content 130 are related based on a frequency of preferred content tags 176 being in common. The relationship map 172 knows the commonalities between different digital video content 130. For example, two shows may be similar in that they are both related to law enforcement, but may be very different in that one is a drama that goes deep into character development whereas the other is a comedy where the background of the characters is not described thoroughly. The relationship mapping engine 126 can update the relationship map 172 as additional digital video content 130 is added to the content delivery system 140.

The user computer 190 includes a graphical user interface (GUI) 192, by which the user interacts with the user computer 190 and the CDVR 150. The user computer 190, can be, but is not limited to: a mobile device, a television, a laptop, a cellphone, or a tablet. The user computer 190 may include internal and external hardware components, as described in further detail below with respect to FIG. 5. In other embodiments, the user computer 190 may operate in a cloud computing environment, as described in further detail below with respect to FIGS. 6 and 7.

A set-top box 114, such as a cable or satellite box is connected to an auditory and video receiving device. The auditory and video receiving device can be embodied as a viewing screen 112, for example, a television. In other embodiments, the set-top box 114 may operate in a cloud computing environment, as described in further detail below with respect to FIGS. 6 and 7.

The CDVR 150 can be a digital recording device capable of receiving, recording, and/or storing digital video content 130 that is available from the content delivery system 140. The CDVR 150 stores instances of the digital video content 130 after the instances are streamed from the content delivery system 140. The CDVR 150 may include internal and external hardware components, as described in further detail below with respect to FIG. 5. In other embodiments, the CDVR 150 may operate in a cloud computing environment, as described in further detail below with respect to FIGS. 6 and 7.

In some embodiments, the CDVR 150 and associated components can be located on the user computer 190, set-top box 114, server 120, or can be a standalone computing device. For illustrative purposes the CDVR 150 is shown as a standalone separate computing device communicating with the user computer 190, the server 120, the set-top box 114, and the content delivery system 140 via the communications network 102.

Figure 2:
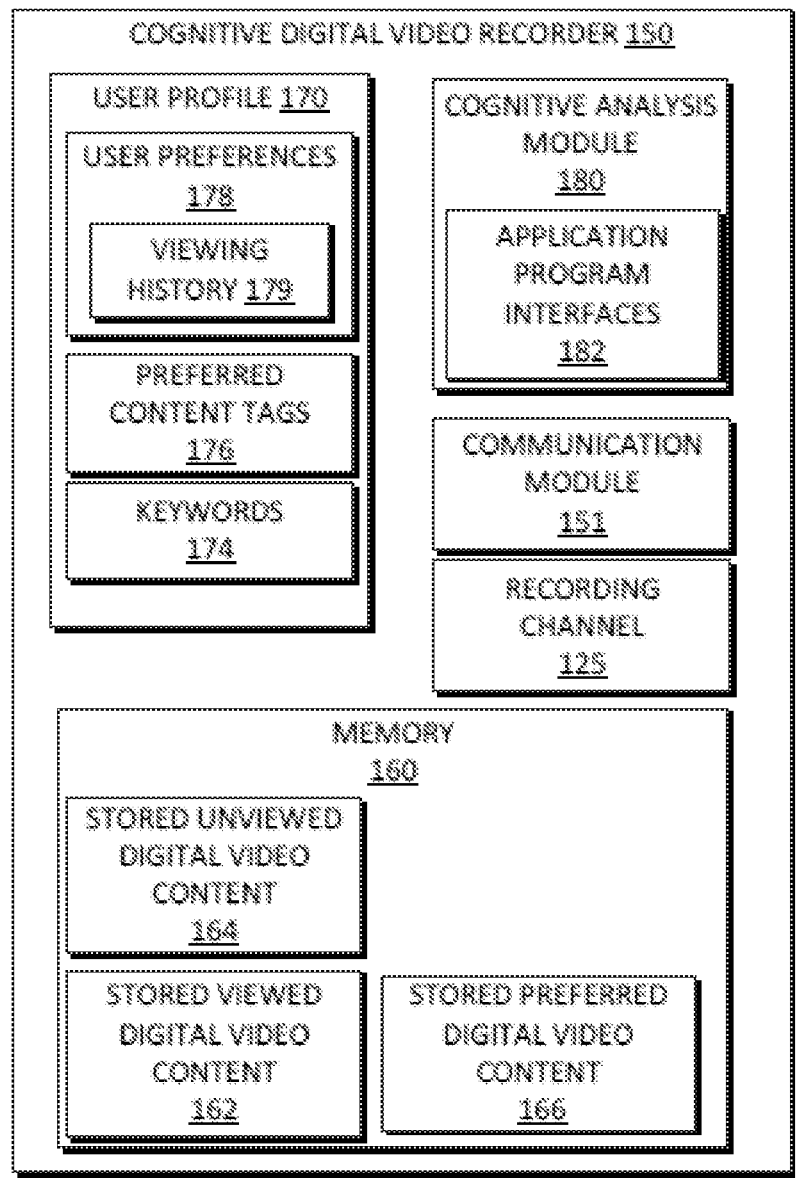
FIG. 2 is a schematic block diagram illustrating a detailed view of a cognitive digital video recorder, according to an embodiment of the present invention.

FIG. 2 depicts the CDVR 150 shown in FIG. 1 in greater detail. The CDVR 150 includes a recording channel 125, a communication module 151, a memory 160, a user profile 170, and a cognitive analysis module 180.

The memory 160 stores instances of digital video content 130 that is delivered to the CDVR 150 by the content delivery system 140 over the communications network 102 (shown in FIG. 1). The instances include stored unviewed digital video content 164, stored viewed digital content 162, and stored preferred digital video content 166. Digital video content 130 is designated as stored unviewed digital video content 164 at the time of recording. Instances of digital video content 130 or stored unviewed digital video content 164 are designated as stored viewed digital video content 162 after viewing. The designation is used to distinguish old content from newly recorded content that is viewed. Instances of digital video content 130 are designated as stored preferred digital video content 166 based on a cognitive analysis determining that the instances of digital video content 130 contain at least one preferred content tag 176.

The recording channel 125 represents one of a plurality of available slots for recording the digital video content 130 on the CDVR 150 after it is delivered from the content delivery system 140 using the communications module 151.

The communication module 151 facilitates communication over the communications network 102 between the CDVR 150 and the other components of the system 15 depicted in FIG. 1, including the content delivery system 140, the server 120, the set-top box 114, and the user computer 190. The communication module 151 receives instances of the digital video content 130 to the CDVR 150 over the communications network 102. Additionally, the communications module 151 notifies the user computer 190 when an instance of digital video content 130 scheduled to be recorded from a channel will not be recorded.

The user profile 170 includes user preferences 178, which further include a number of preferred content tags 176, and the keywords 174. Because the user profile 170 may contain biographical information describing a user, such as by age, and address, there may be multiple user profiles 170, one per user. Each user profile 170 can be linked to social media accounts to provide insights on the user location, and what content the user follows, writes about, and discusses with friends.

The user profile 170 can include a number of preferred content tags 176 that the cognitive analysis module 180 places in the user profile 170 based on monitoring the user viewing an instance of digital video content 130. Thus, the preferred content tags 176 can indicate content that the user prefers.

The user profile 170 can also include a number of user-provided keywords 174 that the cognitive analysis module 180 uses to select preferred content. The keywords 174 can be a string of text, for example "cooking shows," "nature documentaries," and "senate proceedings". The keywords 174 can also be presented as single words, for example, "cooking," "nature," and "senate." The cognitive analysis module 180 uses the keywords 174 to search for matching content tags 134 in the data extracted by the relationship mapping engine on server 120 of the digital video content 130.

The user preferences 178 include a viewing history 179. The viewing history 179 can be a list of the digital video content 130 that the user previously watched or has recorded. The cognitive analysis module 180 can create the user preferences 178 through monitoring the viewing and recording habits of the user, and through analyzing the viewing history 179. The results of the monitoring and analysis can indicate the user preferred content, for example, specific television shows, viewing times, and the like.

The cognitive analysis module 180 implements aspects of cognitive computing, which can be defined as the simulation of human thought processes in a computerized model. Cognitive computing includes self-learning, which is an automated form of unsupervised machine learning that does not use human guidance. Instead, self-learning systems can be trained through techniques including data mining, pattern recognition, and natural language processing. Data mining examines data contained in large databases to produce new information based on the examination. Pattern recognition, classifies input data into objects or classes based on specific features. Natural language processing techniques programmatically process human language and can recognize entities, relations, concepts, sentiment, and emotion in text.

The cognitive analysis module 180 provides aspects of cognitive computing through several application programming interfaces (APIs) 182. The APIs 182 include those to perform data mining, pattern matching, and natural language processing. An additional API 182 takes as input speech from the audio portion of the video and converts it to text that can be input to a tone analyzer. The tone analyzer provides insights about the emotional and social tones reflected in that text, such as anger, fear, anticipation, surprise, joy, sadness, trust, and disgust. A visual recognition API uses deep learning algorithms to identify scenes, objects, and celebrity faces in the video.

The cognitive analysis module 180 applies several APIs 182 to the different components of the user profile 170 to learn the user preferences. For example, the tone analyzer, and natural language processing can be applied to the social media content of the user profile 170. Natural language processing can be applied to the preferred content tags 176 and stored keywords 174 to identify segments from identified instances of digital video content within the relationship map 172 on server 120 that include content related by subject matter, and/or other connections found in the user profile 170.

For example, an embodiment of the present invention can use one or more of the APIs 182 to retrieve and rank the textual information parsed from the received digital video content and the user input keywords in order to determine relevant portions for a user. Then, the user preferences 178 are applied to determine what segment of digital video content to select or filter. Additionally, one or more of the APIs 182 detect preferred content tags 176 and keywords 174 in the instances of stored digital video content 130, and match them with preferred content tags 176 and keywords 174 in the user profile 170.

Primarily, the cognitive analysis module 180 self-learns, and therefore refines the accuracy of the videos presented to the user, based on the results of the last analysis. Additionally, a user may manually influence the self-learning by including preferences in the user profile 170, such as in the keywords 174, to direct the cognitive analysis module 180 away from or toward certain topics. The cognitive analysis module 180 also self-learns when the user indicates disinterest with an instance of stored preferred digital video content 166, for example, by fast forwarding through portions or by deleting the instance. Similarly, interest is indicated when the user re-views an instance or records more digital video content 130 on a particular topic.

The cognitive analysis module 180 may analyze, more than once, the instances of stored preferred digital video content 166, stored viewed digital video content 162, or stored unviewed digital video content 164, alone or in combination. This may occur in response to a user manually editing the keywords 174, or in response to more than one user executing a distinct user profile 170.

Figure 3:
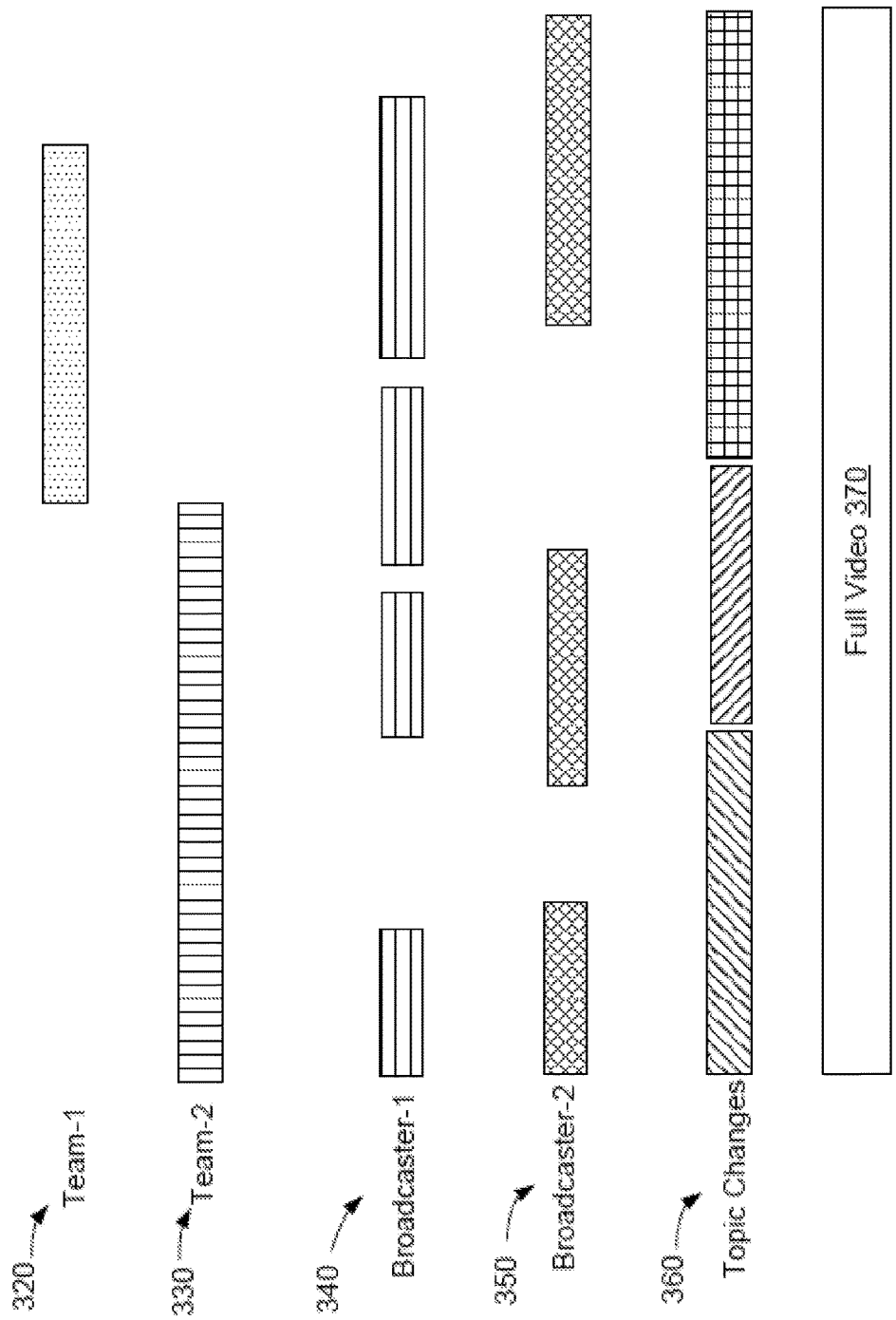
FIG. 3 is a schematic block diagram illustrating segments within digital video content, according to an embodiment of the present invention.

FIG. 3 illustrates possible segments of digital video that can be extracted from digital video content 130. In the example, the full video 370 represents a sports news television program and is an instance of digital video content 130. Segments 320, 330, 340, 350, and 360 depict some of the possible segments that can be extracted from the full video 370, as a result of the cognitive analysis module 180 parsing the video. The segments that refer to Broadcaster-1 340 and Broadcaster-2 350 were extracted. Perhaps the user enjoys listening to Broadcaster-1's style, because it is humorous, provides additional dialog in second language, or for other similar reasons. The segments in which Broadcaster-1 is speaking may be recorded. The segments in which Broadcaster-2 is speaking may not be recorded unless Broadcaster-1 is also speaking in the segment. Similarly, perhaps the full video 370 discusses two different teams (e.g., one segment on a baseball team and one segment on a football team). Team-1 320 and Team-2 330 may be extracted from the full video 370. The user wants to follow only one of these teams (e.g., Team-2) and not watch the full video. As shown, the full video 370 can be segmented, and even further segmented, based on analysis of the content tags 134 contained in the full video 370. The content tags 134 are added to the segments to indicate the frequency of the mention of keywords, sentiment of the dialog or video, and visual recognition. In particular, content tags 134 that indicate anger or violence may be considered for blocking by parental controls.

In current practice, segmenting video tends to operate based on recognizing when images fade-in and fade-out, or based on a set amount of time before and after a segment. However, when segmenting the full video 370, the cognitive analysis module 180 correctly captures segment intros and outros. Commercial breaks could be included before the segments or inserted into the segments based on preferences of the provider of the video source and the length of the recording. The cognitive analysis module 180 can then iterate through the segments, and assign each one a relevance score based on factors, including keywords, keyword frequency, and the user profile 170. An individual segment meeting a relevance threshold is selected for inclusion as an instance of stored preferred digital video content 166. The relevance threshold may be based on content tokens with timestamps that are in other segments. If a certain number or a percentage of content tokens match content tokens in the recorded segment, the other segment is recorded. The content tokens in the recorded segment may or may not be preferred content tags or keywords. Various APIs 182 of the cognitive analysis module 180 can determine whether a segment is understandable on its own, or whether the segment should be linked to other segments to provide context. For example, a segment showing the performance of Team-1 320 should be linked to a segment showing the outcome of the sporting event. Instances of stored preferred digital video content 166 may be further segmented and may be linked together with other segments to create other instances of stored preferred digital video content 166.

Figure 4:
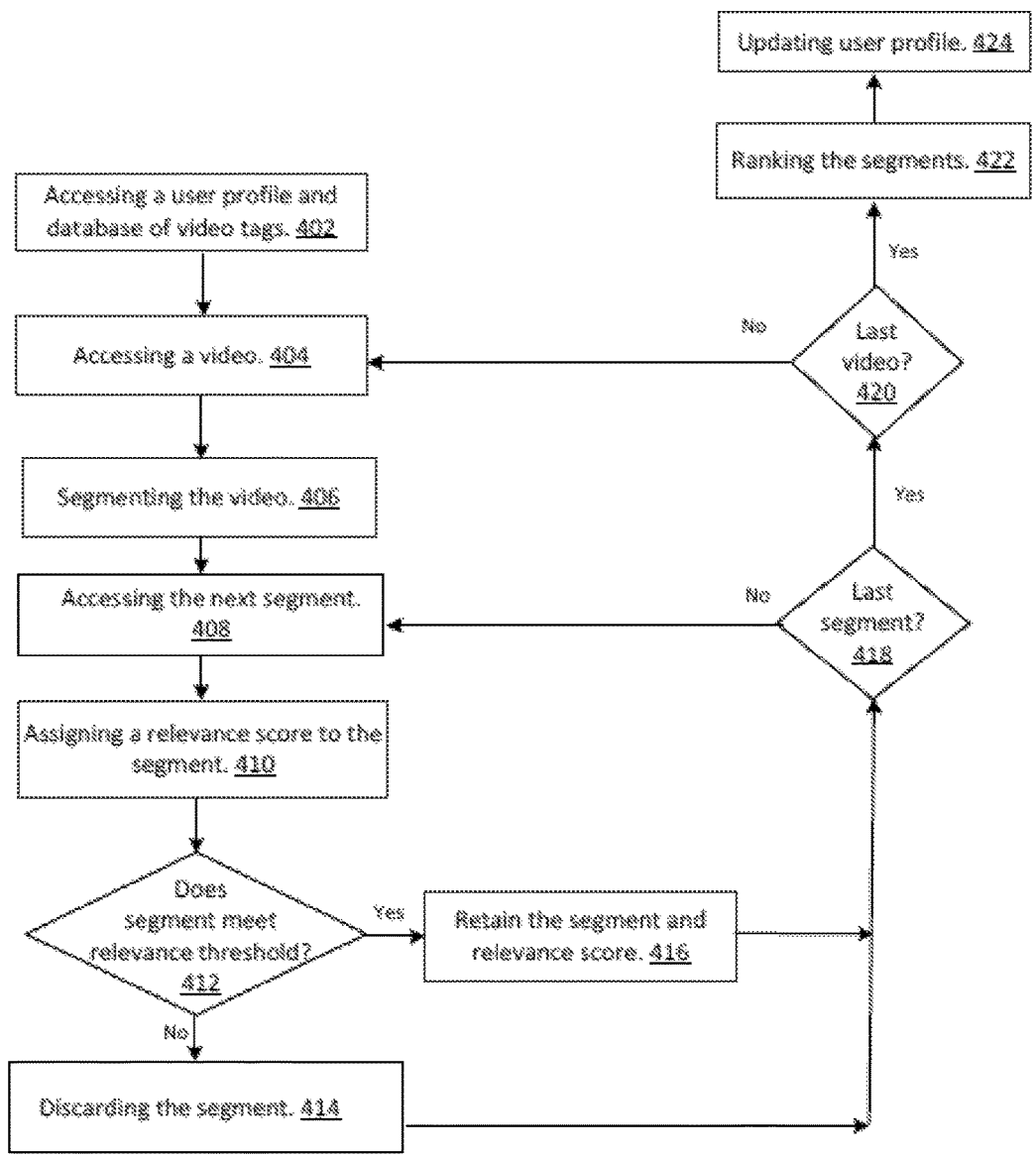
FIG. 4 is a flow chart depicting a method of filtering relevant digital video segments from digital video content, according to an embodiment of the present invention.

FIG. 4 depicts a method of filtering relevant digital video segments from digital video content, according to an embodiment of the present invention. At 402, the cognitive analysis module 180 accesses a user profile 170, including the user preferences 178, keywords 174, and preferred content tags 176. The cognitive analysis module 180 then accesses an instance of digital video content 130 within the relationship map 172 on server 120, at 404. One or more APIs 182, such as for visual recognition, sentiment analysis, and analysis of the audio to text, are applied to segment the video, at 406. After segmenting the digital video content 130, the cognitive analysis module 180 examines each segment further (408) to assign to it a relevance score. The relevance score, assigned at 410, can be calculated based on a relevance threshold value being exceeded. The relevance threshold can be a number or percentage of content tokens that match the user's preferred content tags and/or keywords. As an example, the relevance score can be a simple count of the occurrences of the keywords 174 and/or preferred content tags 176 identified in the instance of digital video content 130. At 412, the cognitive analysis module 180 determines whether the segment being analyzed meets the relevance threshold. This determination may be a comparison of the relevance score to the relevance threshold. If, at 414, the segment is not relevant to the user's preferences because the relevance score does not meet the relevance threshold, then the segment is discarded. However, if the segment is relevant, then, at 416, the segment is retained along with its relevance score. If, at 418, this is not the last segment to be analyzed from the instance of digital video content 130, the cognitive analysis module 180 accesses the next segment at 408, and continues assigning relevance scores to the segments until the end of the instance of digital video content 130 is reached. If this segment is the last segment of the instance of digital video content 130, the cognitive analysis module 180 checks if there is another instance of digital video content 130 to be analyzed, at 420. If there are more instances to analyze, the cognitive analysis module 180 continues to step 404, and proceeds as described above. However, if there are no more instances of digital video content 130, then the cognitive analysis module 180 ranks the analyzed segments, at 422. The segments can be ranked using any available ranking means. In this example, the cognitive analysis module 180 may use a rank and retrieve API to determine which segments would be of most interest to the user based on the calculated relevance score. The higher the relevance score, the more likely that the segments would be of interest to the user. In another example, the the cognitive analysis module 180 may link and append the relevant segments together. A range of relevance scores may be used as a basis for linking together those segments, based on the segments having relevance scores within the range. Additionally, the segments can be appended sequentially, in order of length or based on an increasing or decreasing degree of relevance. Upon analyzing the final instance of digital video content 130, at 424, the cognitive analysis module 180 updates the user profile 170 to reflect changes in relevance of segments in the instances of digital video content 130. Changes in relevance can be reflected in the keywords 174 and/or preferred content tags 176.

Figure 5:
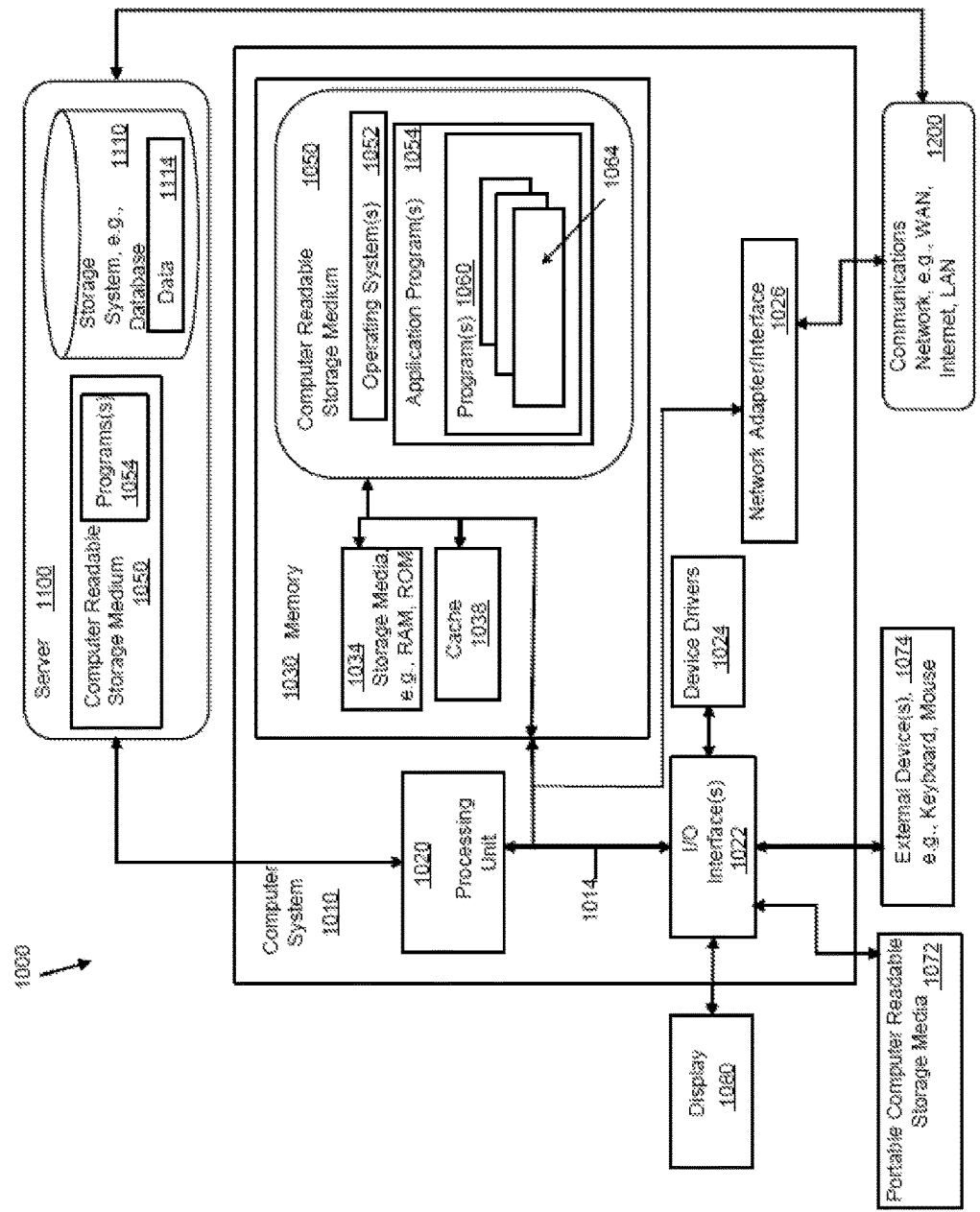
FIG. 5 is a schematic block diagram depicting a computer system according to an embodiment of the disclosure which includes a detailed depiction of a computer (shown generally in FIG. 1) and which cooperates with the system and methods shown in FIGS. 1-4.

Referring to FIG. 5, a system 1000 includes a computer system 1010. The method of FIG. 4, for example, may be embodied in a program(s) 1054 stored on a computer readable storage device, for example, generally referred to as memory 1030 and more specifically, computer readable storage medium 1050. Memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may be embodied as a database 1110 which can include data 1114. The computer system 1010 and the program 1060 shown in FIG. 5 are generic representations of a computer and program that may be local to a user, or provided as a remote service (for example, as a cloud based service), and may be provided in further examples, using a website accessible using the communications network 1200 (e.g. interacting with a network, the Internet, or cloud services). It is understood that the computer system 1010 also represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system and network generically shown as the communications network 1200.

The computer system 1010 may be described in the context of computer system-executable instructions, such as program modules, being executed by a computer system. Program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are represented in FIG. 5 as program modules 1064. The program 1060 and program modules 1064 can execute specific steps, routines, sub-routines, instructions or code, of the program.

The method of the present disclosure can be run locally on a device such as a mobile device, or can be run as a service, for instance, on the server 1100 which may be remote and can be accessed using the communications network 1200. The program or executable instructions may also be offered by a service provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 5, the system 1000 includes the computer system shown in the form of a computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and or/cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The computer system 1010 may also communicate with one or more external devices 1074 such as a keyboard, a pointing device, a display 1080, etc.; one or more devices that enable a user to interact with computer 1010; and/or any devices (e.g., network card, modem, etc.) that enables the computer 1010 to communicate with one or more computing devices. Such communication can occur via the Input/Output (I/O) interfaces 1022. Still yet, the computer 1010 can communicate with one or more networks 1200 such as local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer system 1010 may communicate with a server, embodied as the server 1100, via one or more communications networks, embodied as the communications network 1200. The communications network 1200 may include transmission media and network links which include, for example, wireless, wired or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later depicted.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g. mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g. cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
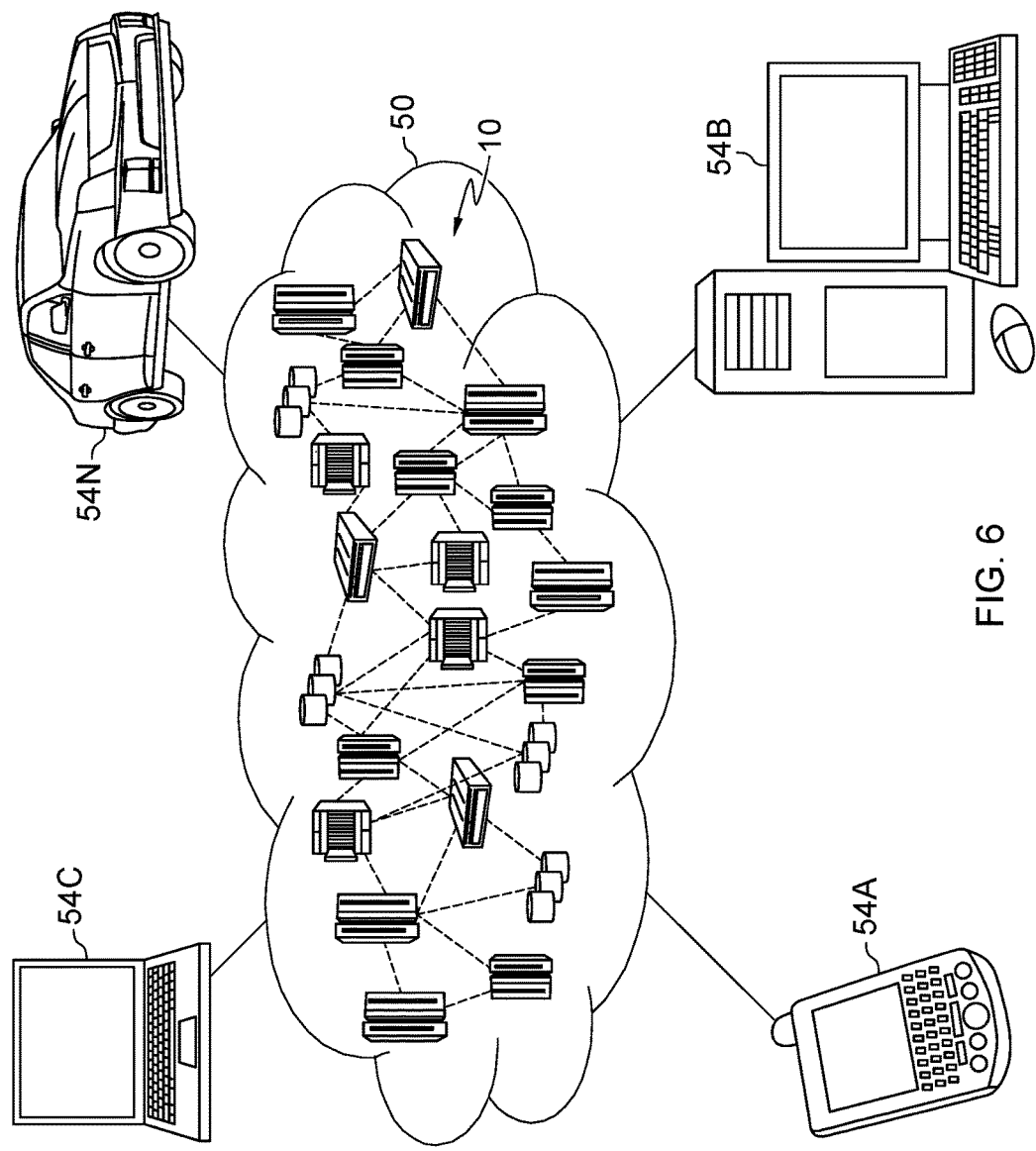
FIG. 6 depicts a cloud computing environment according to an embodiment of the present invention.

Referring now to FIG. 6, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid cloud as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 7:
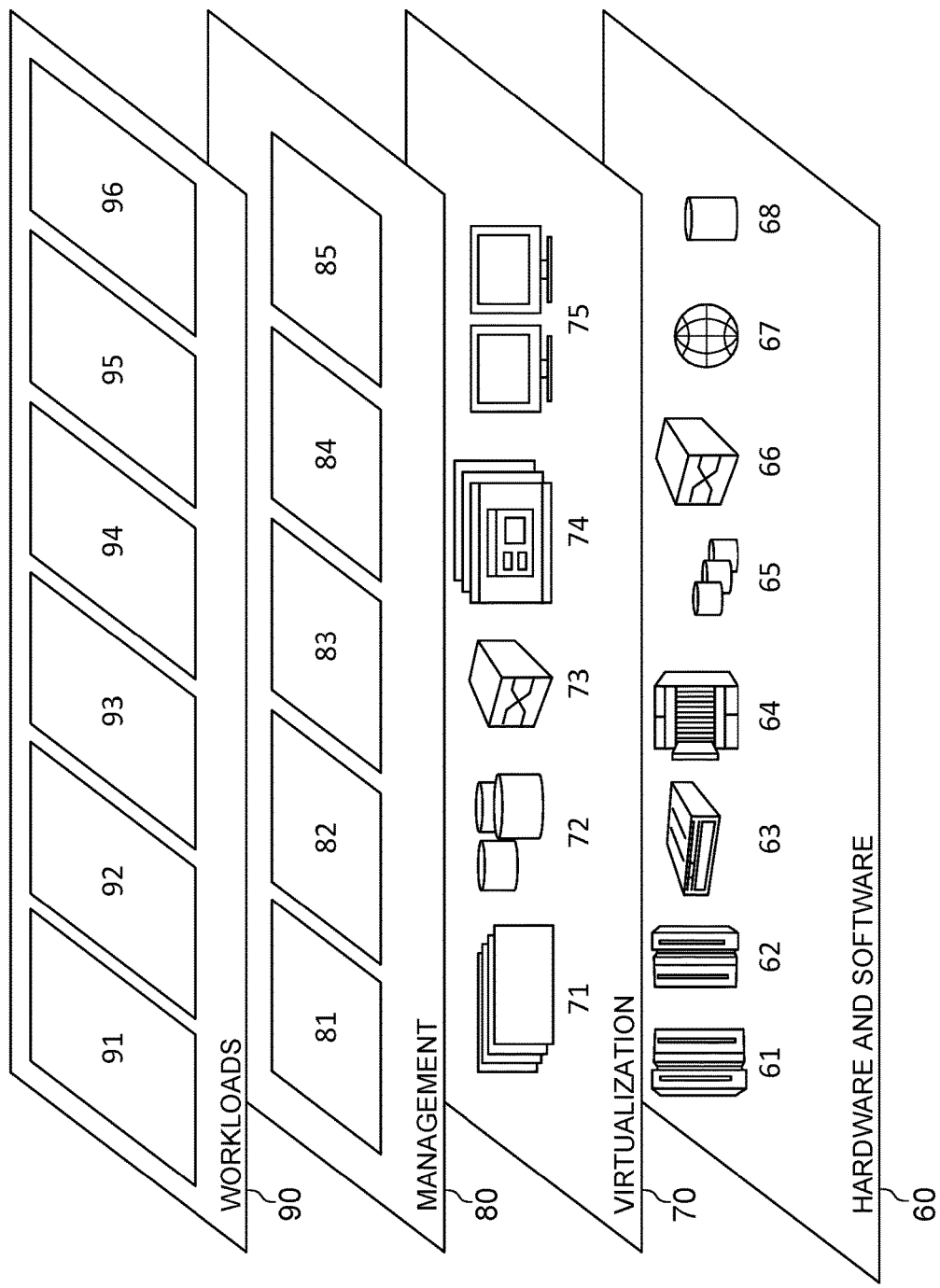
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and 96 digital video content recording.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only (CD-ROM), a digital versatile disk (DVD), a memory stick, a floppy disk, a mechanically encoded device such as punch-cards or raised structures in a groove having instructions recorded thereon, and any suitable combination foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and party on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devise to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the function/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the function noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for digital video content filtering, comprising:
    receiving a request to filter instances of recorded digital video content, stored on a computer readable medium, based on user preferences included in a user profile;
    extracting segments from the instances of recorded digital video content based on content tags in the instances, the content tags having been generated by a computer using cognitive analysis, each segment having an intro and an outro, and storing the segments on the computer readable medium;
    accessing, by the computer, a relationship map and tags from the user profile, wherein the relationship map describes how the segments from the instances of recorded digital video content are related to each other, and the tags are used to describe digital video content;

performing, by the computer, a cognitive analysis of the user profile utilizing the accessed relationship map and tags;

assigning a relevance score to the extracted segments from the instances of recorded digital video content, wherein the relevance score indicates a strength of a relationship between the extracted segments and the user viewing preferences or keywords;

identifying relevant segments based on the relevance score exceeding a predetermined threshold value; and storing on the computer the identified relevant segments.

2. The method of claim 1, further comprising:

ranking the extracted segments in order of descending relevance.

3. The method of claim 1, further comprising assigning a high degree of relevance between the relevant segments based on the relevant segments having relevance scores within a same range; and linking one or more relevant segments together based on a degree of relevance to form a segment having a similar characteristic, including content, sentiment, subject, and type.

4. The method of claim 1, further comprising:

performing cognitive analysis to detect context clues in the one or more segments, the context clues being information that describe the one or more segments.

5. The method of claim 1, wherein the user profile data includes a stored user viewing history, a stored list of computer-generated content tags, a stored list of user entered tags, and a plurality of user preferences, and wherein the cognitive analysis continuously updates the user profile based on a parsing of the user history of viewed digital video content and based on the user viewing one or more relevant segments extracted from the instances of recorded digital video content.

6. The method of claim 1, wherein the performing, by the computer, the cognitive analysis of the user profile data comprises deciding a type and subject matter of interest to the user.

7. The method of claim 1, wherein the cognitive analysis is performed on previously viewed digital video content, relevant segments extracted from the instances of recorded digital video content, and stored but unviewed recorded digital video content.

* * * * *